(12) United States Patent
deCarmo

(10) Patent No.: US 6,816,667 B1
(45) Date of Patent: Nov. 9, 2004

(54) MEMORY EFFICIENT METHOD AND APPARATUS FOR DETERMINING RUN TIMES OF DVD TITLES

(75) Inventor: Linden A. deCarmo, Plantation, FL (US)

(73) Assignee: Zoran Corporation, Sunnyvale, CA (US)

( * ) Notice: Subject to any disclaimer, the term of this patent is extended or adjusted under 35 U.S.C. 154(b) by 0 days.

(21) Appl. No.: 09/239,415

(22) Filed: Jan. 28, 1999

(51) Int. Cl.[7] .............................. H04N 5/85; H04N 7/26
(52) U.S. Cl. ...................................... 386/109; 386/125
(58) Field of Search ............................... 386/33, 45, 98, 386/111, 125–126, 109, 27, 124, 40, 105, 106; H04N 5/85, 7/26

(56) References Cited

U.S. PATENT DOCUMENTS

| | | | | |
|---|---|---|---|---|
| 5,758,008 A | * | 5/1998 | Tozaki et al. ................ | 386/111 |
| 5,771,334 A | * | 6/1998 | Yamauchi et al. ........... | 386/126 |
| 5,902,115 A | | 5/1999 | Katayama | |
| 5,907,659 A | * | 5/1999 | Yamauchi et al. ............ | 386/95 |
| 5,999,698 A | | 12/1999 | Nakai et al. | |
| 6,078,727 A | * | 6/2000 | Saeki et al. .................. | 386/109 |
| 6,122,436 A | * | 9/2000 | Okada et al. ................ | 386/126 |
| 6,130,988 A | | 10/2000 | Jeong | |
| 6,160,954 A | * | 12/2000 | Ogawa ....................... | 369/47.1 |
| 6,181,872 B1 | * | 1/2001 | Yamane et al. ............. | 386/112 |
| 6,212,330 B1 | * | 4/2001 | Yamamoto et al. ......... | 386/125 |
| 6,343,180 B1 | * | 1/2002 | Kim ............................ | 386/126 |

OTHER PUBLICATIONS

Merriam–Webster's Collegiate Dictionary 1997, Merriam–Webster, Inc., Tenth Edition, p. 64.*

* cited by examiner

Primary Examiner—Robert Chevalier
(74) Attorney, Agent, or Firm—Kudirka & Jobse, LLP (57) ABSTRACT

A technique for determining cell starting times for DVD titles entails maintaining a snapshot in memory of starting times for the "most likely" to be played cells, and maintaining in memory a list of "hints" so that starting times for cells outside this most likely list can be quickly accessed. The "most likely" to be played cells are those of an active program chain. An active program chain is the program chain currently being played at any particular time. The hints list can be provided by a chapter array which contains starting times of only chapters (e.g., PTTs) of an active program chain (e.g., PGC). The snapshot in memory of starting times of most likely to be played cells can be provided by a cell array that contains cell starting times for only cells of the active PGC. The stored information is sufficient to determine current running time of a title. There is no need to store starting times for PTTs or cells of non-active program chains.

10 Claims, 5 Drawing Sheets

700
UPDATE CELL TIMES

MEMORY EFFICIENT METHOD AND APPARATUS FOR DETERMINING RUN TIMES OF DVD TITLES

FIELD OF THE INVENTION

This invention relates generally to improvements in digital versatile disc (DVD) systems and, more particularly, to playback of disc content by such systems. The invention may find application in a variety of other multimedia applications.

BACKGROUND OF THE INVENTION a) Digital Versatile Disc Systems

Digital versatile discs (DVDs) are information storage devices used for storing prerecorded audio information, video and other visual information, and computer software. The storage mechanism used in DVDs closely resembles that used in compact discs (CDs). DVD players also use the same laser technology as CD players. Briefly, both DVDs and CDs store information as a pattern of pits formed in a metallic substrate. The pit patterns form digital words and can be read by shining a laser beam on the disc surface and detecting the reflected beam. The information storage capacity of a typical DVD, however, is much higher than a CD. Presently available DVDs have a variety of capacities which depend on the technology used to manufacture the discs. Single-layer technologies can be either single or double-sided with current capacities of 4.7 gigabytes and 9.4 gigabytes, respectively. Dual layer technologies use single or double sided technologies that currently hold approximately 8.5 gigabytes per side.

DVDs can store information in several formats. DVD-VIDEO discs can store video information (e.g., movies, TV episodes, or music videos) using known information compression algorithms, such as MPEG-2 for video compression/decompression. DVD-ROM discs can store digital data in compressed form for computer use, though the format is usually significantly different from that found on DVD-VIDEO discs.

DVD-VIDEO players are often directed to the consumer market for entertainment use in homes, e.g., for high-resolution, high-fidelity playback of movies or music. DVD-VIDEO players have many CD player features, such as the ability to play selections in any order desired and the ability to read information from any point on the disc. Therefore, DVDs are finding a significant market as a preferred storage and playback system for a wide variety of multimedia.

Information concerning DVD-VIDEO content, discs and players, including (without limitation) data encoding/decoding, data formatting and structures, and navigation and playback, can be had with reference to the "DVD 1.0 Specification for Read-Only Disc", Vol. 3 (herein referred to as the "DVD Specification"). The DVD Specification can be obtained, for example, from Toshiba Corp., 1-1 Shibaura 1-Chome, Minato-ku, Tokyo 105-01 Japan.

The data on a DVD-VIDEO disc is organized into a hierarchical set of disc (or physical) data structures, and a corresponding, hierarchical set of presentation (or logical) data structures. The disc data structures contain DVD-VIDEO data arranged in a way closely linked to the physical location and arrangement of the data on the DVD-VIDEO discs. On the other hand, presentation data structures are independent of the physical order of the data on the disc and serve a role of providing navigational information that determines the presentation order of the DVD content. With this versatile arrangement, a DVD-VIDEO disc can contain multiple titles, and/or alternative playback sequences within a title, with the disc's data shared among its different titles and playback sequences.

The multiple types or layers of presentation data structures are given below:
Disc Data Structures
    Video Title Set (VTS)
        Video Object Sets (VOBSs)
            Video Objects (VOBs)
                Cell Objects (cells)

Title is both a memory data structure and logical construct constituting a creative work stored on a DVD-VIDEO disc, such as an individual movie. A DVD-VIDEO title can contain up to 999 program chain objects (PGCs). PGCs can be used to create different versions (camera angles, ratings, outcomes, etc.) of the same title. Each PGC of a DVD-VIDEO links between zero and 99 related program objects, and governs the order in which its programs are to be played. A simple DVD-VIDEO title can contain only one PGC; however, complex titles can contain two or more PGCs to allow user access to and control of a variety of programs (i.e., interactive user control). A multiple-PGCs title can play programs sequentially, randomly (with program repeats), or in shuffle mode (without program repeats). Each program object, for example, a scene of a movie, is an ordered collection of pointers to cells. Individual cells may be used in more than one PGC, different PGCs defining different, alternative sequences through the DVD content. Additionally, a DVD-VIDEO title can have multiple Parts_of_Title (PTTs), each referencing a program object. PTTs are analogous to chapters of a book, and, e.g., can mark different scenes of a movie. PTTs divide a DVD-VIDEO title into a maximum of 99 different parts. Individual PTTs can be part of the same or different PGCs.

The multiple types or layers of presentation data structures are given below:
Presentation Data Structures
    Title
        PTT'(s)
            Program Chain (PGC)
                Program(s) (PGs)
                      Cells (pointers)

A video title set (VTS) is essentially analogous to a title and takes the form, on the disc, of a main directory called a VIDEO_TS directory. The VIDEO_TS directory references two types of files distinguished with the file extensions, .IFO and .VOB. A file with the .VOB extension consists of the VOBS data structure, which contains the actual multimedia data in a number of cells. A file with the .IFO extension contain navigational data structures and a processor-independent interpreted language that specifies how the VOBS data structures are arranged and where the associated data are located on the disc. During playback, a DVD-VIDEO player sorts the files on the disc to form a number of video title sets, for example, a number of movies. Each VTS is a grouping of all files on the disc necessary to play a particular title, and is composed of one .IFO file and one or more associated .VOB files containing pointers to a number of individual cells.

The disc structures and presentation structures are linked at the cell level. Each cell specifies, for example, all the video and audio data associated with a group of pictures in the VTS and may span multiple disc blocks. Essentially, a cell constitutes the smallest addressable chunk of data on the DVD-VIDEO disc. A cell is divided into VOBUs, each of which being a container object that includes both multimedia data and playback program commands in an interleaved format. VOBUs, in turn, are broken into packs of packets of compressed bits of video and audio data. Different packs contain data for specifying navigating order (NAV-PCKs) and subpictures, in addition to video (V-PCK) and audio (A-PCK). Each packet on a DVD-VIDEO disc consists of 2048 bytes from a single bitstream, aligned to a disc block.

While a VOBU is playing, the DVD-VIDEO player can obtain input directly from a user by means of controls, such as buttons, which can be displayed under playback program control onscreen along with the multimedia data. For example, user selection of a button can cause the playback program to jump to a new location on the disk and begin playback at the new location. Some DVD content is specifically designed for user-interactive operation, where users can actually change the flow of a video or movie, or change its ending, by user input specifying a different, particular PGC of the title. Such interactive operation results in a change in the order of playback of the individual cells forming the title.

b) Cell Starting and Running Times

DVD-VIDEO players have the responsibility for monitoring starting times of cells. This information can be used to provide users, in real-time during playback, with the length of time expired during playback of the title. Unfortunately, the DVD discs cannot store a starting time for playback of each cell. Cells on a DVD-VIDEO disc are played at different times in the presentation of a single title on the disc pursuant to different PGCs, or at different times in the presentation of different titles on the disc. Therefore, there is no known, reliable way to pre-determine and store cell starting times on pre-recorded discs.

For this reason, known DVD-VIDEO systems determine cell starting times before a title plays by walking through the title's data structures, monitoring and storing the playback length for each cell, and then calculating the starting times for a given cell by adding the playback lengths of previous cell(s). For example, a title could have a Cell A of length 10 milliseconds, Cell B of 50 milliseconds and Cell C of 30 milliseconds, etc. If these cells were played back sequentially, Cells A, B and C would have respective playback starting times of zero, ten and sixty milliseconds. These starting times are typically stored in a cache memory. Cache memory is used in DVD systems to perform read-ahead operations in order to minimize the time required to retrieve data and in order to handle interrupts that halt the transfer of data from a disc to the playback system. Unfortunately, the size of memory in current DVD-VIDEO players usually precludes use of this approach to store cell starting times.

This can be better understood from the following description of such DVD-VIDEO memory requirements. A title can contain up to ninety-nine chapters (PTTs). Each PTT references a DVD program within a PGC. Each PGC can contain up to 255 cells. Typically, a starting time is stored in a four-byte field, specifying the time typically in milliseconds in a binary coded decimal form. Under a worse case scenario, where a title contains 99 PTTs, and each PGC is unique and contains 255 cells, the total memory consumption for the title can be calculated as follows:

99 *PTTs*×1 *PGC*×255 cells per *PGC*×4 bytes per cell=100,980 bytes

It can thus be seen that storing the starting times for all possible combinations of cells can result in a relatively high memory requirement of over 100 kilobytes.

This approach of storing all the cell starting times in memory can be suitable for use in a DVD drive of a computer system, which has large amounts of the computer's virtual memory available. Unfortunately, it is often not suitable for memory-constrained environments, which cannot store such quantities of data. Current, stand-alone DVD-VIDEO players intended for the consumer market typically incorporate non-expandable cache memories of only 32 or 64 kilobytes due to cost constraints. Such cache memories are too small to store all the approx. 100 kilobytes of data for the worse case scenario described above.

Another approach to calculation of cell starting times entails, at each cell boundary, reloading all preceding cells and calculating time expired before the current cell. Unfortunately, this approach has a negative performance implication since, typically, content playback would cease, the DVD drive would seek to different locations on the disc and intensive calculations would need to take place before playback could resume.

Accordingly, it would be desirable to provide a system for monitoring starting times of cells, which utilizes available memory efficiently and is suitable for use in consumer-oriented DVD-VIDEO players. Such a system should be able to determine also, in real time, the running time expired during playback of the title, e.g., for display to users.

SUMMARY OF THE INVENTION

The invention resides in maintaining in memory the following data structures used for determining cell starting times, e.g., for DVD titles: a snapshot of starting times for the "most likely" to be played cells, and a list of "hints" so that starting times for cells outside this most likely list can be quickly determined.

The "most likely" to be played cells are preferably those of an active program chain (PGC) cells outside the most likely list are, preferably, those of other PGCs of a title, if any). An "active" program chain is the program chain currently being played at any particular time. The hints list can be provided by a chapter or PTT array which contains starting times of only those chapters of the active PGC. The snapshot in memory of starting times of most likely to be played cells can be provided by a cell array that contains cell starting times for only those cells of the active PGC. The stored information is sufficient to determine current running time of a title. There is no need to store starting times for PTTs or cells of non-active program chains. A DVD-VIDEO player can use the stored information to determine the starting time of the current cell, track current running time of a title, and display such running time for users, e.g., on a DVD-VIDEO display.

A preferred embodiment uses these arrays in tandem to determine the starting times for an active cell of a DVD-VIDEO title. The cell array's starting times are sufficient to provide all cell starting times for single-PGC titles (i.e., individual titles having a single PGC). Both the cell array's and PTT array's starting times are used to calculate cell starting times for multi-PGC titles (i.e., individual titles having two or more PGCs). During playback, the starting time stored in the cell array for a starting cell of a PGC is set to the value stored in the PTT array for the starting time of a starting PTT of the PGC. The starting times stored in the cell array for each subsequent cell of the PGC is computed by adding the PGC's prior cells' lengths to the starting cell's starting time. With this approach, the starting time for the active cell is always in memory. If a new PGC is to be played, the starting times for the cells in the new PGC are computed, and only the starting times of those cells need be stored in the cell array. Maintaining the hints list makes calculation of these cell times for a new PGC a simple matter.

More particularly, in the preferred embodiment, a processor in the DVD player walks though each PTT encountered in a DVD-VIDEO bitstream supplied by a DVD-VIDEO source, loads the program and PGC specifier referenced by that PTT into the memory, and computes the starting times for all the cells in that PTT. The starting times of all cells of PTTs referencing the same PGC are loaded in the cell array. Since the majority of the PTTs exist in the same PGC, the data in the cell array can satisfy requests for starting times of cells of the active PGC, whether it is the sole PGC of a single-PGC title or one PGC of a multi-PGC title. For multi-PGC titles, when a new PGC (e.g., the second, third, etc., up to the last PGC of the title) is encountered in the bitstream and the starting time for a cell is requested, the cell array is refreshed (i.e., re-loaded) with the cell starting times for that new PGC. These are obtained by determining the starting time of the starting PTT of the new PGC by adding the duration of the last cell of the prior PGC to that cell's starting time, and storing the result in the PTT array entry for the starting PTT of the new PGC. Then, the processor uses the starting time of the starting PTT of the new PGC, as stored in the PTT array, as the starting time of the starting cell of the PGC. The processor walks through each PTT of the new PGC, and each of the cells of each of those PTTs, calculating their starting times and storing them in the respective PTT array and cell array. Their respective starting times can be calculated by adding the durations of prior cells/PTTs in the new PGC to the starting time of that starting cell. This embodiment repeats these steps for each PGC of the title. Thus, the cell array contains the starting times of only cells of the active PGC, and the PTT array contains the starting times of only PTTs of the active PGC.

The foregoing-described implementation permits cell playback timing information to be efficiently stored in memory. It can be stored in as little as four bytes of memory for each PTT in the active PGC, plus four bytes for each cell in the active PGC. Advantageously, in the preferred embodiment, a starting time for the currently playing cell can be resident and available in cache memory at all times during playback. The memory can accommodate even the worse case scenario described above for a title having the maximum number of PTTs, PGCs and cells permitted by the DVD Specification. Moreover, for most titles, once the most likely cell starting times are calculated (i.e., the starting times of cells of the active PGC), it is unlikely these times will have to be swapped out by starting time for other cells since PGCs that require such changes are unusual. If swapping occurs, only the starting times for the cells in a new PGC need to be recalculated.

BRIEF DESCRIPTION OF THE DRAWINGS

The above and other features, objects and advantages of the invention will be better understood by referring to the following detailed description in conjunction with the accompanying drawing, in which.

DETAILED DESCRIPTION OF A PREFERRED EMBODIMENT

Figure 1:
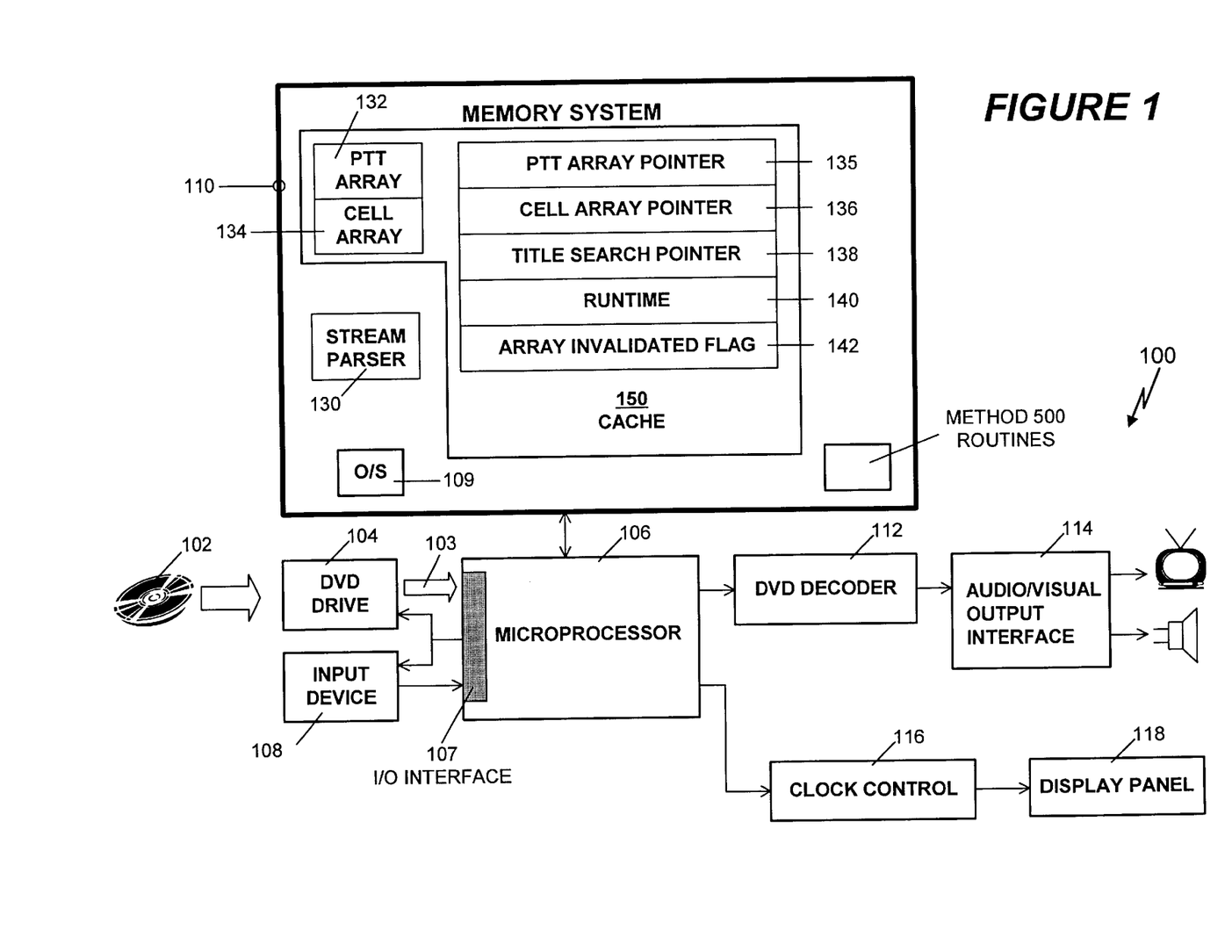
FIG. 1 is a block diagram of a DVD player in accordance with an embodiment of the invention.

FIG. 1 shows a DVD-VIDEO player 100 for playing back a pre-recorded DVD-VIDEO disc102 to present an audio and/or visual output to users. As illustrated, the DVD-VIDEO system 100 has a conventional DVD-VIDEO disc reader or drive 104 for reading information from the DVDs 102, which has been compressed and encoded in accordance with the DVD Specification. While not separately shown, those skilled in the art will appreciate that the DVD drive 104 has, for example, an optical pick-up and a disc motor, both under the control of a servo processor or controller. The DVD-VIDEO drive 104 passes a DVD bitstream 103 to a microprocessor 106, which can also receive other input from an input device 108, such as a keyboard. The use of the DVD-VIDEO drive 104 should not be construed as a limitation; other conventional DVD sources could also provide the DVD bitstream 103, such as the Internet, digital satellite dishes, etc.

The microprocessor 106 has an input/output interface 107, such as a driver program, which enables its memory-resident operating system 109 to control and exchange information with the DVD-VIDEO disc reader 104. The microprocessor 106 processes the DVD bitstream 103 by running certain DVD computer programs, described below, stored in a memory system 110. The resulting stream of data is provided to a DVD decoder 112, which decodes the DVD content and provides the resulting audio and/or visual information to an audiovisual output interface 114, for presentation to users, for example, by a TV monitor and/or a speaker. The microprocessor 106 also passes a clock control signal, generated from timing information contained in the DVD bitstream 103, to a clock control module 116. The clock control module 116 controls a display panel 118 for display of a count indicating the portion played of the current DVD-VIDEO title.

The processing of the DVD bitstream 103 by the microprocessor 106 will now be described in greater detail. During processing, the microprocessor 106 executes a stream parser program 130 fetched from the memory system 110, which operates on the DVD bitstream 103. As noted above, the DVD bitstream 103 can include content data, formatting data and navigation data. The stream parser program 130 is initialized when the DVD player system 100 commences operation. During operation, the stream parser 130 causes the DVD content data to be transferred to the DVD decoder 112, where the content data is decompressed and decoded in a conventional manner. The stream parser program 130 also causes the navigation data and formatting data to be processed, and commands included therein to be executed, typically in a conventional manner. Further information regarding a suitable stream parser for DVD players can be had with reference to a co-pending, common-assigned U.S. patent application Ser. No. 09/014,480, entitled "DVD Navigation System with Multiple Independent Threads," filed by Linden A. deCarmo and Amir M. Mobini. In the present invention, however, the stream parser program 130 calls certain special routines, described below, that provide running time information concerning the title being played.

In accordance with an implementation of the invention, the DVD-VIDEO player 100 maintains in memory system 110 a number of data structures, pointers and flags used in determining the running time information. These include a PTT array or memory data structure 132, a cell array or memory data structure 134, a PTT array pointer 135, a cell array pointer 136, a title search pointer 138, a RUNTIME variable 140, and an array invalidated flag 142. These will be described in detail below.

Figure 2:
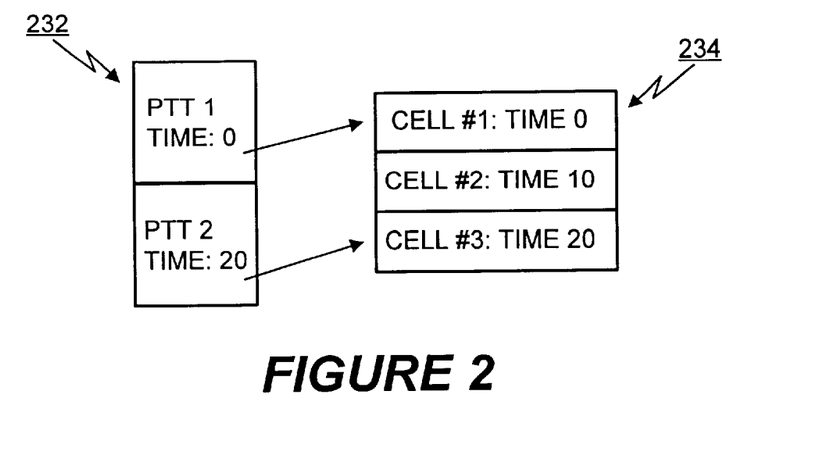
FIG. 2 is a conceptual diagram of PTT and cell arrays for an illustrative, single-PGC title in accordance with the embodiment of FIG. 1.

FIG. 2 illustrates the PTT array 232 and cell array 234 as used by the DVD-VIDEO player 100 for a simple, exemplary title having, e.g., two PTTs (chapters) with a single PGC (program chain). PTT 1 references, e.g., two cells, denominated cell #1 and cell #2; and PTT 2 references, e.g., a single cell, denominated cell #3. The PTT array 232 stores the starting times of all PTTs, which in this case are 0 and 20 milliseconds for PTT 1 and PTT 2, respectively. The cell array 135 stores starting times and durations for every cell in the PTTs of this example, and is used in tandem with the PTT array 232 to determine the starting times for all cells in the title. In the illustrated example, cell #1, #2, and #3 have respective starting times of 0, 10, and 20 milliseconds. It should be noted that PTT 1 has the same starting time as its cell #1, and its playback would continue for the duration of cell #1 followed at time 10 milliseconds by the playback of cell #2 and continue for the duration of cell #2. Afterwards, PTT 2 starts at the same time as its cell #3, i.e., time 20 milliseconds, and continues for the duration of cell #3.

During operation in accordance with this implementation, the DVD-VIDEO player 100 (FIG. 1) initially walks through each PTT of the title being played, i.e., PTT 1 and then PTT 2, and runs the appropriate routines discussed below for the individual, successive PTTs. In so doing, the DVD-VIDEO player 100 determines the starting times for all cells in each PTT and stores them in the cell array 234, and determines the starting times for PTT 1 and PTT 2 and stores them in the PTT array 232. The system 100 uses the calculated starting times to determine the running time of the title up to the current cell. This information, along with the pointers for the PTT and cell arrays and the clock signal, can indicate the portion of the title that has been played, or the portion of the title yet to be played.

DVD titles can be played back sequentially, randomly, or in shuffle mode. For this reason, DVDs employ program chains (PGCs) to link related program objects (e.g., particular scenes) within a title for playback purposes. A simple title can contain only a single program chain or PGC; however, complex titles can contain two or more program chains (multi-PGCs) to allow the user flexible access to a variety of programs. In the case of simple titles having a single PGC, the starting times stored in the cell array 234 can fully provide all cell starting times for the title, as the player steps through the PTTs of the title by sequentially stepping through, in order, the cells of the PTTs. Accordingly, the foregoing description of the PTT and cell arrays operation for FIG. 2 applies to simple titles and can be scaled to accommodate titles with more PTTs and/or cells. In multi-PGC titles, when a new PGC is loaded and, for example, the starting times for a particular cell is requested, the cell array is refreshed with the new times for each successive, active PGC. For multi-PGC titles, the foregoing discussion of FIG. 2 would only apply to the first PGC in the title.

Figure 3:
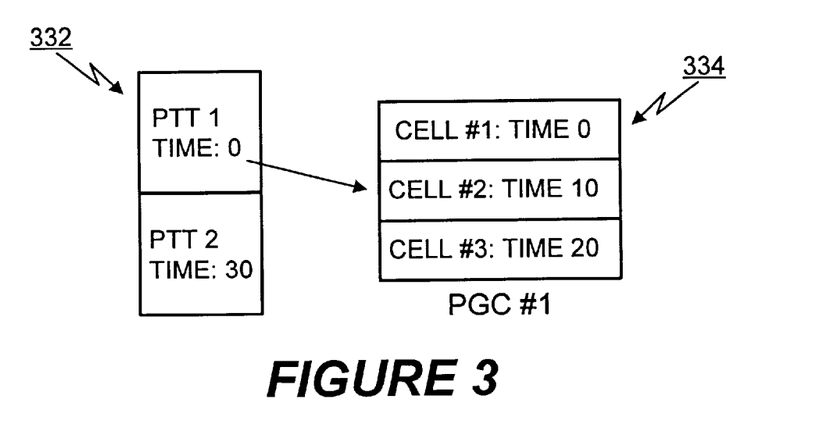
FIGS. 3 and 4 are conceptual diagrams of PTT and cell arrays for an illustrative, multi-PGC title at different times during playback in accordance with the embodiment of FIG. 1.
Figure 4:
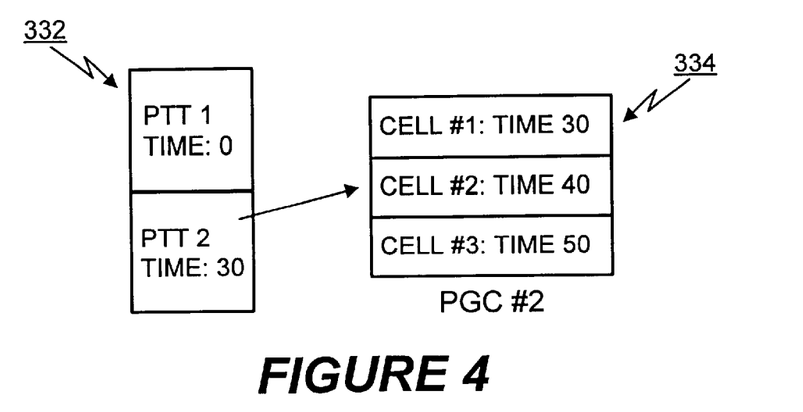

FIGS. 3 and 4 depict a PTT array 332 and cell array 334 for an illustrative multi-PGC title, where the PTTs of the title exist in different PGCs. In the illustrated example, PTTs 1 and 2 exist in PGC #1 and PGC #2, respectively. As can be seen in FIG. 3, PGC #1 contains a single chapter, PTT 1 which, in turn, contains cells #1, #2 and #3; and, in FIG. 4, PGC #2 also contains a single chapter, PTT 2 which also, in turn, contains cells #1, #2, and #3. In this example, the starting times stored in the cell array 324 are completely changed when playback transitions from PTT 1 to PTT 2 and, thus, from PGC #1 to PGC #2. More specifically, in FIG. 3, the starting time for PTT 1 is the same as the starting time for cell #1, i.e., time zero; the cells #1, #2, and #3 have respective start times of 0, 10 and 20 milliseconds; and each of the cells #1, #2, #3 plays sequentially until completion of PTT1 (and thus PGC #1) at time 30 milliseconds. In FIG. 4, the starting time for PTT 2 is the same as the starting time for its cell #1, i.e., time zero; the cells #1, #2, and #3 have respective starting times of 30, 40 and 50 milliseconds; and each of the cells #1, #2, #3 plays sequentially until they complete PTT 2 (and thus PGC #1). It should be noted that the cell array 334 stores the starting time of 30 milliseconds for PTT 2 as the starting time of the first cell (cell #1) in the cell array for PTT 2, i.e., 30 milliseconds. Thus, the cell array for multi-PGC titles stores only the starting times and durations for the active PGC's cells.

Figure 5:
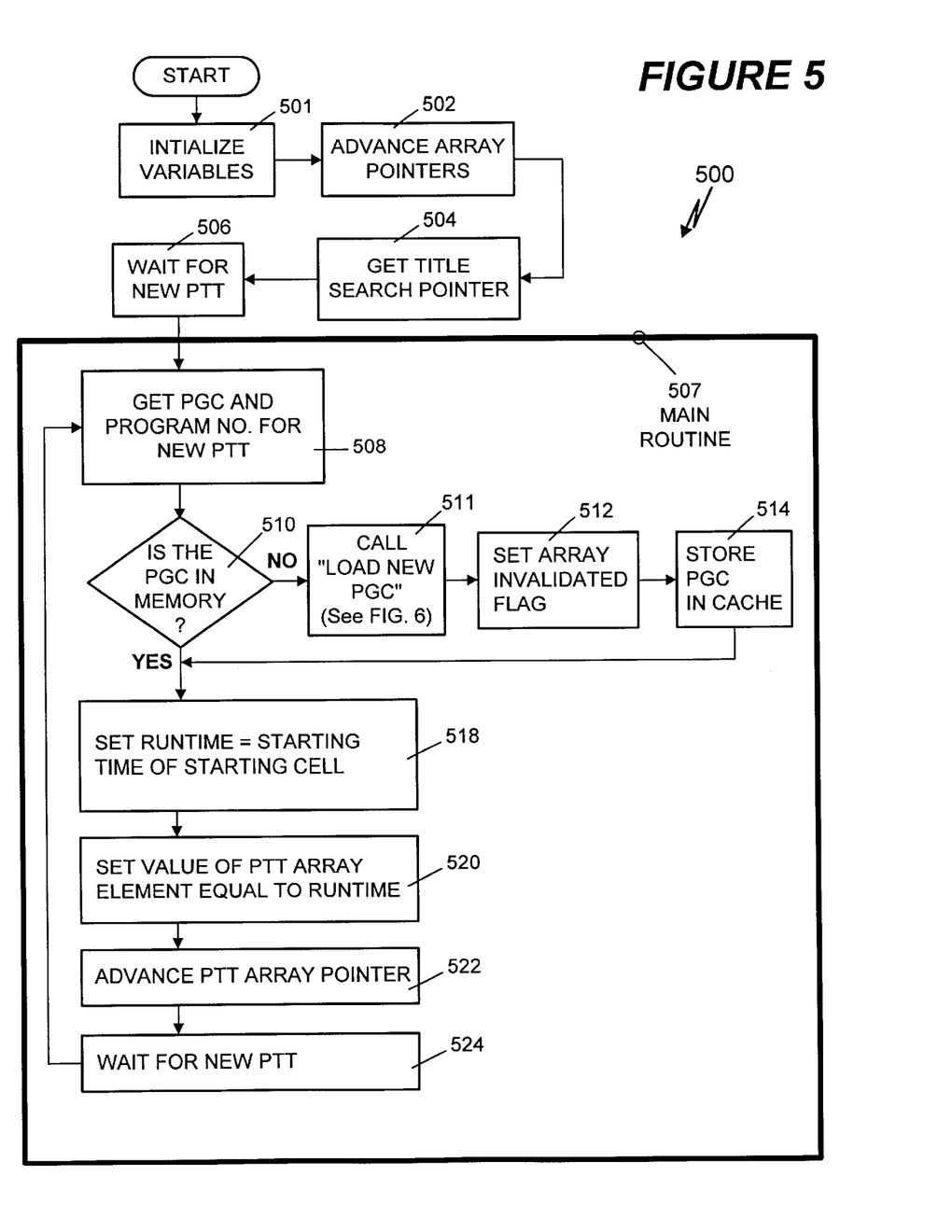
FIG. 5 is a block diagram depicting a method for determining starting times of cells and running times of titles in accordance with the embodiment of FIG. 1.

FIG. 5 depicts a computer-implemented method 500 for determining starting times of PTTs and cells during playback of DVD content by the DVD-VIDEO player 100 of FIG. 1. The illustrated method 500 can be implemented as several, individually callable computer program routines, which are called by the parser program in response to DVD content (specified below) in the bitstream read from the DVD-VIDEO disc 102 (FIG. 1). The variables used in this embodiment include:

PTT Array Pointer 135—a pointer to an index in the PTT array;

Cell Array Pointer 136—a pointer to an index in the cell array;

Title Search Pointer 138—indicates the number PTTs and the number of viewing or camera angles in a scene, e.g., five viewing angles requiring five cells, each viewing angle being an angle block; and RunTime 140—contains a count of the running time of a title.

Method 500 commences when the DVD player system 100 starts operation and the stream parser program 130 (FIG. 1) is initialized and calls method 500. The method 500 starts by initializing the variable RunTime 140 (FIG. 1) (e.g., to zero), and the values of the PTT and cell array pointers 135, 136 (FIG. 1)(e.g., set to zero) at step 501, advancing the pointers by one element at step 502, and then fetching the title search pointer 138 (FIG. 1) at step 504. Afterwards, the method 500 waits for the bitstream parser program 130 to encounter a new PTT in the bitstream before running its main routine 507.

When the bitstream parser detects a new PTT, method 500 at step 508 gets the PGC and program number for the new PTT. A PTT essentially serves as a table of addresses that point to its associated PGC identification specifier or number and program identification specifier or number, which uniquely identifies one of the programs associated with the PTT that makes up the title. Then, step 510 tests whether the fetched PGC is stored in memory. If it is not, then step 511 calls or invokes a Loading New PGC routine 600, as depicted in FIG. 6.

Figure 6:
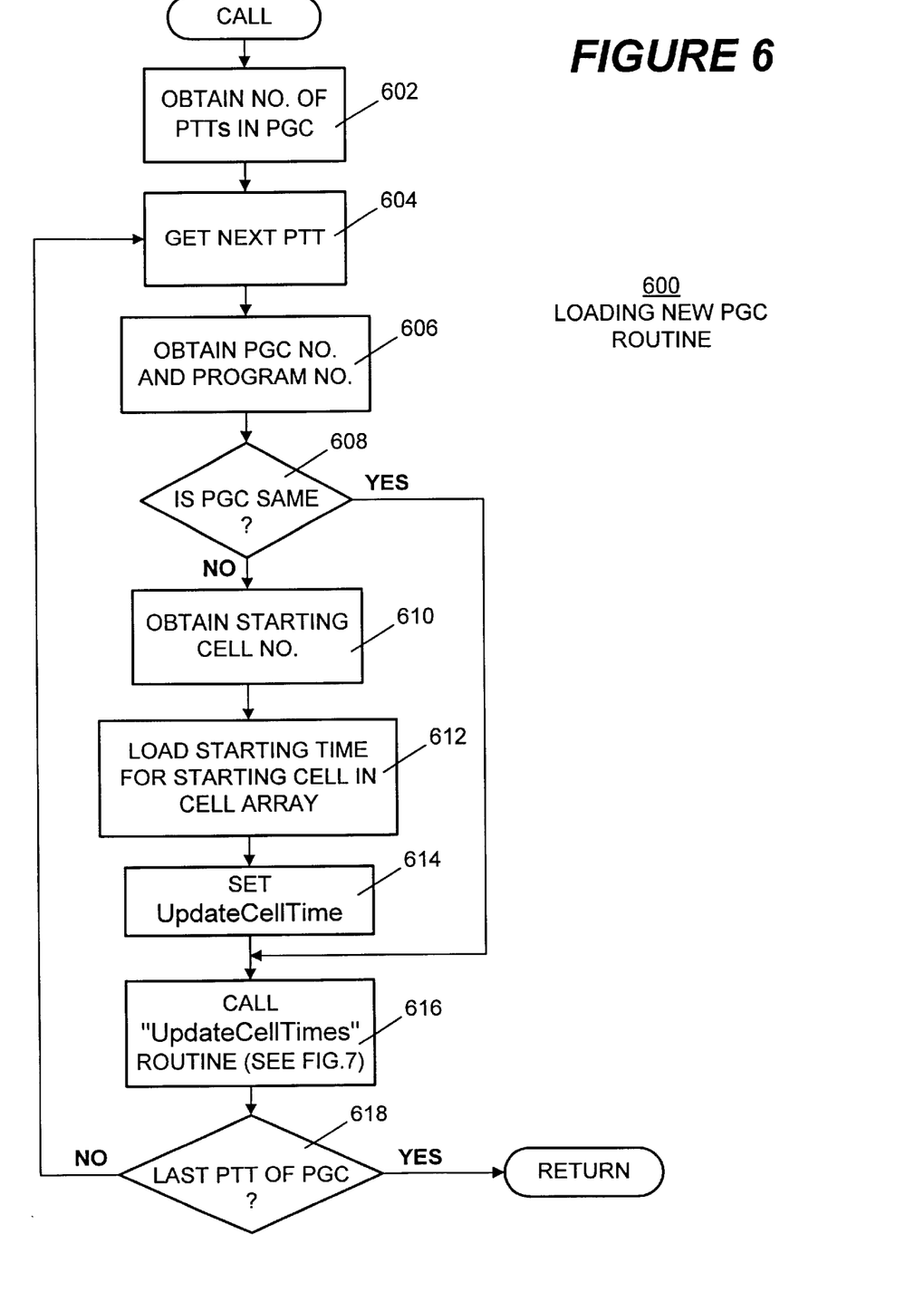
FIG. 6 is a block diagram of a Load New PGC routine of the method of FIG. 5.

FIG. 6 shows the Loading New PGC routine 600 as including the step 602 of obtaining the number of PTTs, which can be obtained from a PTT search table that has, for each PTT, a reference to a PGC used for that PTT. For each PTT up to the number of PTTs referencing the same PGC, routine 600 performs a number of steps, as follows: Step 604 gets a next PTT. Step 606 obtains a PGC number and a program number referenced by the PTT. Step 608 determines whether the PGC for the new PTT is the same as the PGC for the immediately prior PTT, if any, that the method 500 just processed. In other words, if the PTT is either the first to be processed in the title or the first of a new PGC, step 608 indicates that the PGC for the new PTT is not the same as for the prior PTT. If not the same PGC, step 610 obtains a starting cell number referenced by the program indicated by the program number. Step 612 sets the value of the cell array element indicated by the cell array pointer and corresponding to the starting cell number equal to the starting time stored in the PTT array for the element indicated by the PTT array pointer. Step 614 sets the value of a variable UpdateCellTime to the starting time for the starting cell number. Step 616 calls the Update Cell Times routine of FIG. 7, which will be described shortly. Finally, step 618 tests whether the PTT is the last PTT. If it is not, the routine 600 loops back to step 604. If it is the last PTT, control is returned to the main routine 507.

Figure 7:
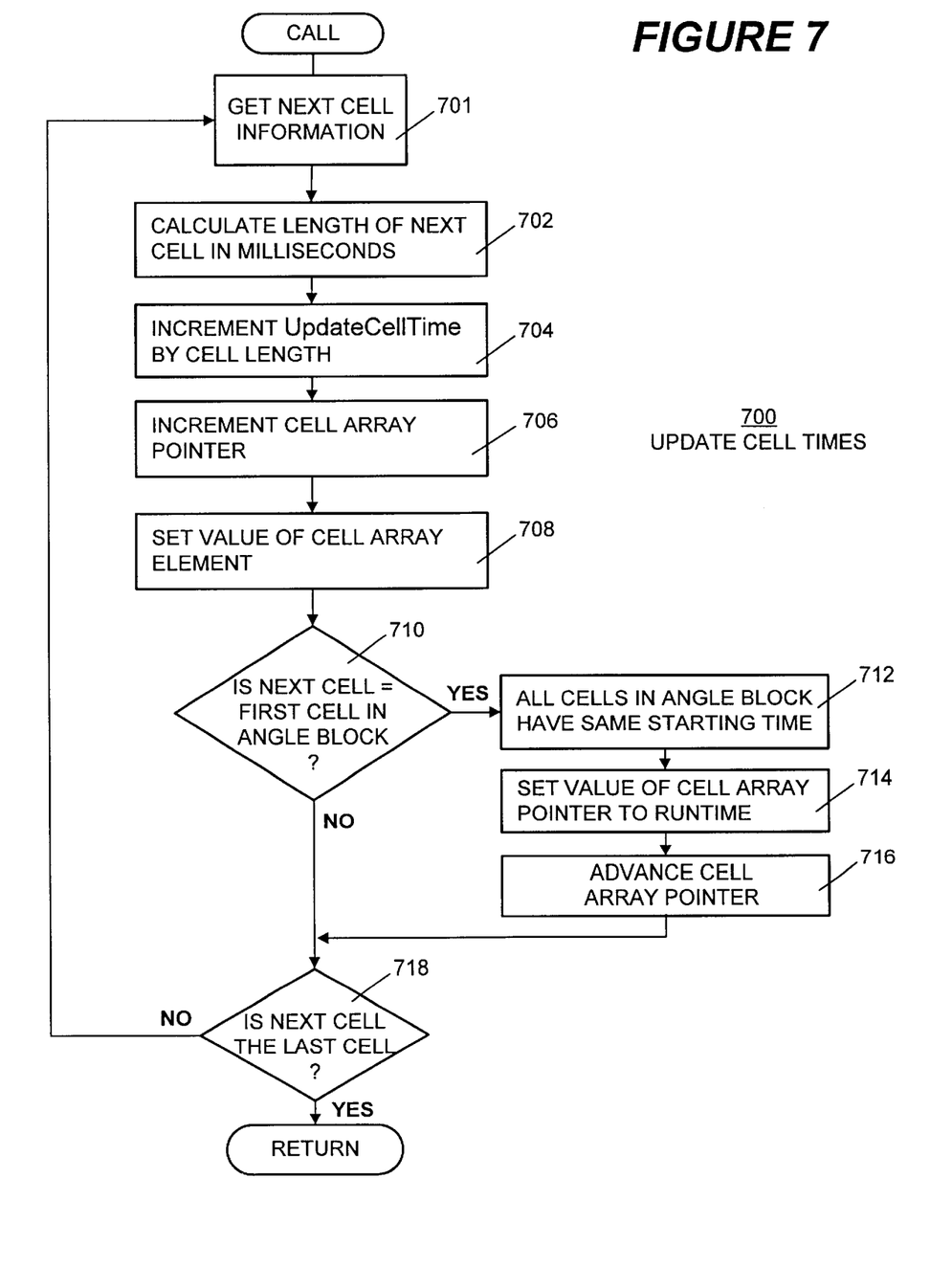
FIG. 7 is a block diagram of an Update Cell Times routine of the method of FIG. 5.

FIG. 7 shows the Update Cell Times routine 700 in accordance with an embodiment of the invention. When called, the routine 700 steps through the following steps for each cell in the PTT, including the starting cell (as indicated by the program number) and all subsequent cells, in order to continue loading the cell array. Step 701 gets information for a next cell in the PTT. Step 702 calculates the playback length of the next cell in milliseconds in step 702. (Starting times and duration can be given in any format; the milliseconds unit is a convenient example.) Next, in step 704, the routine 700 increments the value of a variable UpdateRunTime by the just-calculated cell length. In step 706, the routine 700 advances the cell array pointer by one element. Step 708 sets the value of the cell array element indicated by the cell array pointer to the value of UpdateCellTime. Step 710 tests whether the next cell is the first cell in an angle block, as indicated by the title search pointer. If the next cell is the first cell of an angle block, the routine 700 insures that all cells in the angle block have the same starting time at step 712, sets the value of the cell array pointer to the RUNTIME at step 714, and advances the cell array pointer by one element at step 714. Then, after step 716, or if the test of step 710 indicates that the next cell is not a first cell of an angle block, the routine 700 tests in step 718 whether the next cell is the last cell of the current PTT. If it is not, the routine 700 returns to step 701, described above. If the last cell has been encountered, the routine 700 returns the value of UpdateCellTime to method 500, which proceeds as next described.

Then, method 500 at step 512 sets a flag to indicate that the prior values of the cell array had been invalid. Step 514 stores the PGC in cache.

Next, after step 514, or after step 510 if the PGC was already in memory, method 500 proceeds to the following steps. Step 518 sets the value of RunTime to the starting time stored in the cell array for the starting cell in the PTT. Step 520 sets the value of the element in the PTT array indicated by the PTT array pointer to the value of RunTime. Step 522 advances the PTT array pointer by one element. Finally, step 524 causes the method 500 to wait for a next PTT in the bitstream and return to step 508 and the ensuing steps described above until all the starting times for all the PTTs referencing the PGC have been loaded into the PTT array. At any time during this process, the value of RunTime will indicate the current running length of the title.

Accordingly, the routines of method 500 cause the DVD-VIDEO player 100 (FIG. 1) to walk through all the PTTs of a single-PGC or multi-PGC title, calculate the PTT starting times and cell starting times, and then store the calculated starting times in the respective PTT and cell arrays. As a result, the current running time can be determined at any time during playback from information stored in the PTT and cell arrays, even though that information only contains starting times of PTTs and cells of a current PGC of the title. Accordingly, this foregoing embodiment utilizes memory in a highly efficient manner.

In the illustrative embodiment described above, the programs of system 100 can be implemented using object-oriented programming techniques. As will be understood by those skilled in the art, Object-Oriented Programming (OOP) techniques involve the definition, creation, use and destruction of "objects". These objects are software entities comprising data elements, or attributes, and methods, or functions, which manipulate the data elements. The attributes and related methods are treated by the software as an entity and can be created, used and deleted as if they were a single item. Together, the attributes and methods enable objects to model virtually any real-world entity in terms of its characteristics, which can be represented by the data elements, and its behavior, which can be represented by its data manipulation functions. In this way, objects can model concrete things like people and computers, and they can also model abstract concepts like numbers or geometrical designs.

A software implementation of the above described embodiment(s) may comprise a series of computer instructions either fixed on a tangible medium, such as a computer readable media, e.g. diskette, CD-ROM, ROM, or fixed disc, or transmittable to a computer system, via a modem or other interface device, such as communications adapter 190 connected to a network over a medium. The medium can be either a tangible medium, including but not limited to optical or analog communications lines, or may be implemented with wireless techniques, including but not limited to microwave, infrared or other transmission techniques. The series of computer instructions embodies all or part of the functionality previously described herein with respect to the invention. Those skilled in the art will appreciate that such computer instructions can be written in a number of programming languages for use with many computer architectures or operating systems. Further, such instructions may be stored using any memory technology, present or future, including, but not limited to, semiconductor, magnetic, optical or other memory devices, or transmitted using any communications technology, present or future, including but not limited to optical, infrared, microwave, or other transmission technologies. It is contemplated that such a computer program product may be (a) distributed as a removable media with accompanying printed or electronic documentation (e.g., shrink wrapped software), (b) preloaded with a computer system, e.g., on system ROM or fixed disc, or (c) distributed from a server or electronic bulletin board over a network, e.g., the Internet or World Wide Web.

Although various exemplary embodiments of the invention have been disclosed, it will be apparent to those skilled in the art that various changes and modifications can be made which will achieve some of the advantages of the invention without departing from the spirit and scope of the invention. It will be obvious to those reasonably skilled in the art that other components performing the same functions may be suitably substituted. Further, the methods of the invention may be achieved either in all software implementations (using the appropriate object or processor instructions), or in hybrid implementations (using a combination of hardware logic, software logic and/or firmware to achieve the same results). The specific configuration of logic and/or instructions utilized to achieve a particular function, as well as other modifications to the implementations of the invention, are intended to be covered by the appended claims.

What is claimed is:

1. A digital versatile disc (DVD) apparatus for determining the running time of a title stored on the DVD, said apparatus including:

a chapter array for simultaneously storing a plurality of starting times of chapters of only an active program chain in the title, the title having multiple program chains;

a cell array for simultaneously storing a plurality of starting times of cells of only the active program chain in the title; and a mechanism for tracking chapters and cells as played and using the chapter array and cell array to provide an indication of running time of the title.

2. The apparatus according to claim 1, wherein:

the chapter array holds only the starting times of chapters referenced by a single program chain of the title;

the cell array holds only the starting times of cell of the single program chain, and the tracking mechanism tracks running time using the starting times for the chapters and cells of the single PGC.

3. The apparatus according to claim 1 wherein said mechanism includes a memory for storing a pointer into the chapter array and a pointer into the cell array.

4. The apparatus according to claim 1 further comprising a program stored on a computer media for processing a DVD-VIDEO bitstream read from a DVD-VIDEO source.

5. The apparatus according to claim 1 wherein the DVD_VIDEO source comprises a disc reader for reading a disc containing multiple titles provided to a DVD-VIDEO player for processing.

6. A method for determining starting times of cells in a bitstream read from a DVD disc, said bitstream defining a title, said title having a number of chapters, each said chapter comprising a number of cells; said method comprising:

maintaining a chapter array in a memory for simultaneously storing a plurality of starting times of chapters referenced by only an active program chain of the title, the title having multiple program chains;

maintaining a cell array in the memory for simultaneously storing a plurality of starting times for cells referenced by only the active program chain of the title; and using the chapter array and cell array to determine a current count of running time of the title.

7. A DVD player comprising:

A) a DVD drive for reading a DVD disc, said DVD disc comprising media for storing at least one title, the title having a plurality of chapters and a plurality of cells arranged in at least one program chain;

B) a microprocessor for processing a DVD bitstream of data read from the DVD disc;

C) a memory;

D) apparatus for determining running time of the title stored on the DVD disc, said apparatus including:

a chapter array stored in the memory for simultaneously storing a plurality of starting times of chapters of only an active program chain of the title, the title having multiple program chains;

a cell array stored in the memory for simultaneously storing a plurality of starting times of a number of the cells included in the chapters of only the active program chain of the title; and a mechanism controlled by the microprocessor for tracking chapters and cells as played and using the chapter array and cell array to provide an indication of running time of the title.

8. The DVD player of claim 7, wherein the mechanism responds to each new program chain in the title by reloading the chapter array with starting times for the chapters corresponding to the new program chain and reloading the cell array with starting times for the cells corresponding to the new program chain.

9. A computer program product stored on a computer media for reading a data stream from a DVD_VIDEO disc, and determining running times of one or more titles contained in the data steam, said product comprising:

first computer usable code for parsing the data stream for content information, said data stream defining a title including a number of chapters, a number of program chains, and, in each chapter, a number of cells;

second computer usable code for maintaining a chapter array for simultaneously storing a plurality of starting times of chapters referenced by only an active program chain of the title, and a cell array for simultaneously storing a plurality of starting times of cells referencing only the active program chain of the title; and third computer usable code for determining a current running time of a title based on the starting times in the chapter and cell arrays.

10. The computer program product of claim 9, wherein the first, second and third computer useable code respond to each new program chain in the title by reloading the chapter array with starting times for the chapters corresponding to the new program chain and reloading the cell array with starting times for the cells corresponding to the new program chain.

* * * * *